United States Patent [19]

Lightfoot

[11] Patent Number: 4,642,649

[45] Date of Patent: Feb. 10, 1987

[54] PASSIVE RANGING METHOD AND APPARATUS USING INTERFEROMETRIC SCANNING

[75] Inventor: Fred M. Lightfoot, Burton, Wash.

[73] Assignee: The Boeing Company, Seattle, Wash.

[21] Appl. No.: 537,498

[22] Filed: Sep. 30, 1983

[51] Int. Cl.[4] .............................................. G01S 3/14
[52] U.S. Cl. ..................... 342/458; 364/458
[58] Field of Search .............. 343/458, 424, 451, 465, 343/10, 12 R, 16 R, 16 M, 17.7, 369, 378, 453; 364/458

[56] References Cited

U.S. PATENT DOCUMENTS

| | | | |
|---|---|---|---|
| 2,637,028 | 4/1953 | McIlwain | 343/16 R |
| 3,005,200 | 10/1961 | O'Meara | 343/439 |
| 3,036,210 | 5/1962 | Lehan et al. | 455/78 |
| 3,134,896 | 5/1964 | Briggs | 364/487 |
| 3,181,813 | 5/1965 | Gulick, Jr. et al. | 244/3.19 |
| 3,202,992 | 8/1965 | Kent et al. | 343/372 |
| 3,221,328 | 11/1965 | Isch | 343/16 M |
| 3,238,527 | 3/1966 | Vogt | 343/362 |
| 3,242,430 | 3/1966 | Ghose | 455/137 |
| 3,243,145 | 3/1966 | Simon et al. | 244/3.19 |
| 3,271,770 | 9/1966 | Lees | 343/424 |
| 3,303,503 | 2/1967 | Stabilito | 343/458 |
| 3,329,955 | 7/1967 | Beukers et al. | 343/418 |
| 3,430,243 | 2/1969 | Evans | 343/465 |
| 3,480,233 | 11/1969 | Chu | 244/3.18 |
| 3,719,948 | 3/1973 | Mueller | 343/455 |
| 3,740,002 | 6/1973 | Schaefer | 244/3.19 |
| 3,801,983 | 4/1974 | Woolley | 343/16 M |
| 3,812,493 | 5/1974 | Afendykiw et al. | 343/12 R |
| 3,842,419 | 10/1974 | Arndt | 343/458 |
| 3,863,257 | 1/1975 | Kang et al. | 343/458 |
| 3,864,682 | 2/1975 | Maier | 343/424 |
| 3,873,984 | 3/1975 | Weisbrich, Jr. | 343/458 |
| 3,897,918 | 8/1975 | Gulick, Jr. et al. | 244/3.19 |
| 3,922,533 | 11/1975 | Royal | 364/516 |
| 3,935,574 | 1/1976 | Pentheroudakis | 343/424 |
| 3,971,027 | 7/1976 | Alcock et al. | 343/424 |
| 3,982,246 | 9/1976 | Lubar | 343/451 |
| 4,136,342 | 1/1979 | Alcock et al. | 343/424 |
| 4,156,877 | 5/1979 | Piesinger | 343/368 |
| 4,170,774 | 10/1979 | Schaefer | 343/16 M |
| 4,204,655 | 5/1980 | Gulick et al. | 244/3.19 |
| 4,215,345 | 7/1980 | MacDoran | 343/465 |
| 4,316,193 | 2/1982 | Jones et al. | 343/458 |
| 4,339,755 | 7/1982 | Wright | 343/458 |
| 4,393,382 | 7/1983 | Jones | 343/458 |
| 4,494,118 | 1/1985 | Graves | 343/17.7 X |

FOREIGN PATENT DOCUMENTS 1041589 9/1962 United Kingdom ................ 343/458

OTHER PUBLICATIONS

M. Skolnik, *Intro. to Radar Systems*, pp. 165–167; McGraw-Hill, New York, 1984.
Dictionary of Electronics, by R. F. Graf; p. 419; Sams and Co., Inc., Indianapolis, 1974.

*Primary Examiner*—Theodore M. Blum
*Assistant Examiner*—Bernarr Earl Gregory
*Attorney, Agent, or Firm*—Christensen, O'Connor, Johnson & Kindness

[57] ABSTRACT

In a passive-type ranging system in which a pair of directional antennas mounted in spaced apart relationship along a baseline are synchronously scanned on a distant emitter of RF radiation for determining the range to the emitter as a function of a time differential $t_{21}$ of the received emissions at the spaced antennas, an improved method and apparatus is disclosed in which each of the separate antennas is replaced by an electronically steered interferometer sensor. The pair of spaced, interferometer sensors are scanned in phase-locked synchronization to cause the characteristic multiple interference lobes and intervening nulls to sweep across the distant emitter. Certain of the sensors, lobes, or nulls, are used as highly directional indices for precision measurement of the range determining time differential $t_{21}$. In order to maintain close phase synchronization between the scanning positions of the multi-lobe interference patterns, a pilot signal emitter is mounted on the same platform as the interferometer sensors and positioned along the boresight of the sensors for emitting a point source of a known signal to which the electronic steering signals that drive the sensors are phase-locked.

16 Claims, 9 Drawing Figures

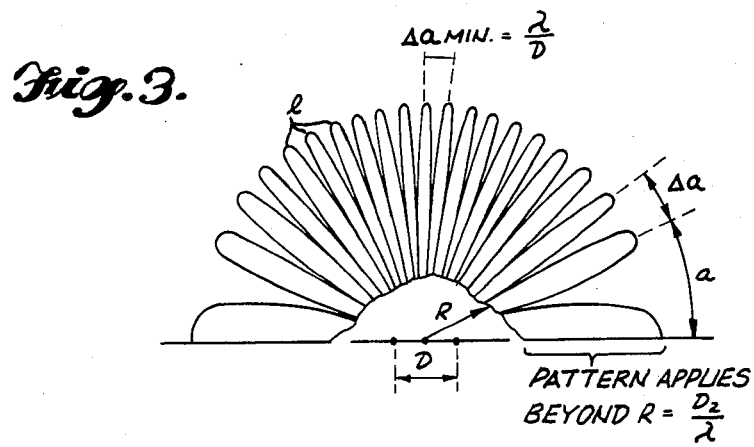
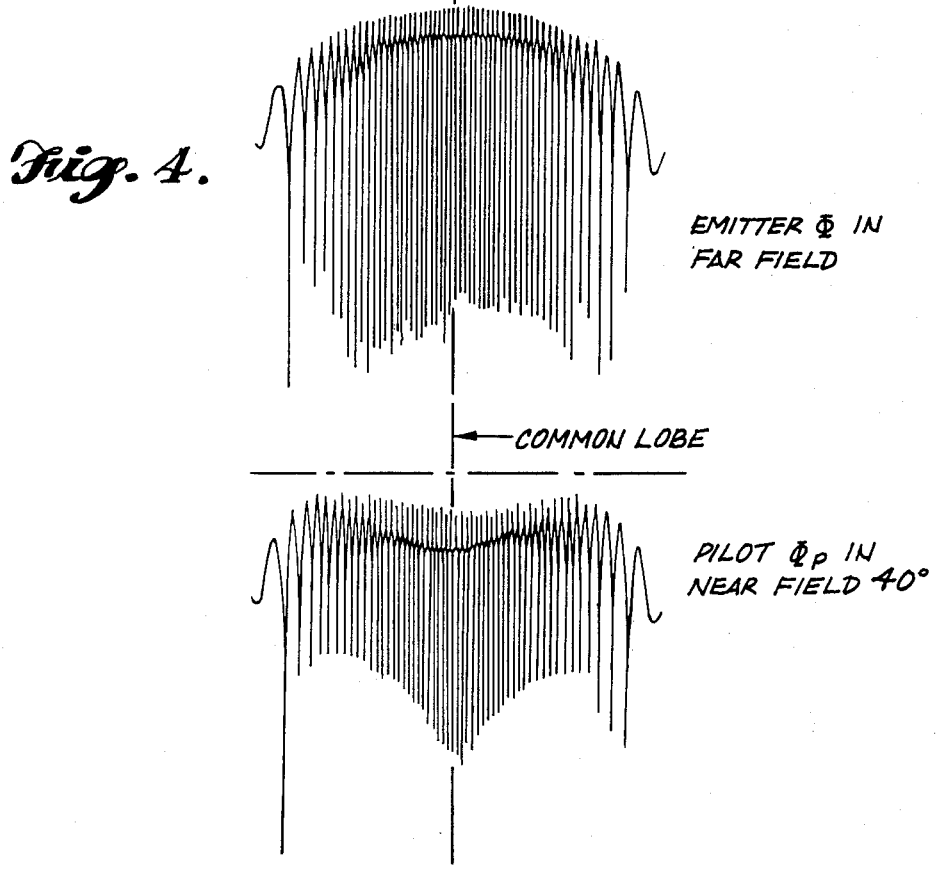

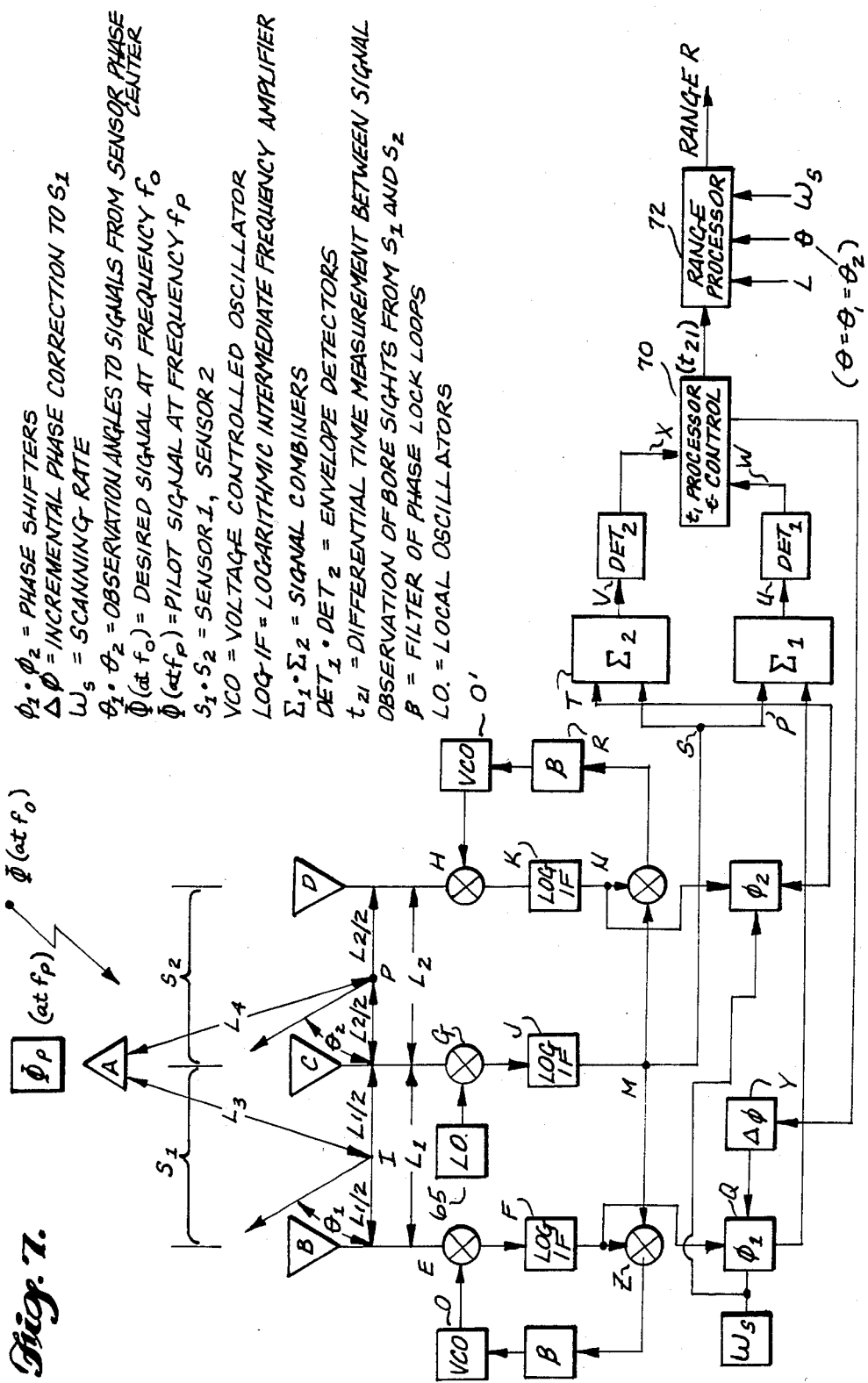

PASSIVE RANGING METHOD AND APPARATUS USING INTERFEROMETRIC SCANNING

BACKGROUND OF THE INVENTION

This invention pertains to passive-type range determining systems for measuring the distance (i.e., range) to a source of electromagnetic radiation, especially in the radio frequency spectrum.

As described in a U.S. Pat. No. 4,339,755, issued to James M. Wright on July 13, 1982, and assigned to The Boeing Company of Seattle, Washington, there are certain navigational and surveillance operations in which it is desirable to measure the range between an antenna platform and a distant source of electromagnetic radiation of unknown position, without transmitting from the platform, a signal, such as a radar signal, that would reveal the location of the platform. The platform may, for example, be a manned or unmanned aircraft.

As described in U.S. Pat. No. 4,339,755, signal monitoring equipment is carried by the aircraft platform for determining the range to the emitter by first measuring a small time differential $t_{21}$ that occurs between the receipt of the emission at one scanning antenna carried on the platform relative to the time of receipt of the same emission by a second scanning antenna mounted on the platform at a predetermined baseline separation from the first-mentioned antenna. The scanning of the antennas is synchronized so that their respective beams are parallel and sweep across the emitter at slightly different times. The time differential $t_{21}$ together with signals representing an angle of arrival $\phi$ of the radiation, a distance L of the baseline separating the antennas, and their scanning rate $\omega_s$ are processed in a ranging formula:

$$R = (L\cos\theta)/(t_{21}\omega_s)$$

In a disclosed embodiment in U.S. Pat. No. 4,339,755, the pair of scanning antennas are mounted on the opposed wing tips of an aircraft in order to achieve a baseline length L that is as long as practical for the given platform, to improve the accuracy of the range measurement. Nevertheless, even with such a baseline separation, the accuracy of this existing arranging system has certain limitations. Primary limitations are the beam widths of the scanning antennas and the relatively large inertial constraints on the mechanical rotation of the antennas. Size constraints on the individual antennas carried by the aircraft result in a beam width and hence directional sensitivity that may be too large for precision ranging under some conditions. The beam width is especially limiting when there is a need to cover a relatively wide spectrum of frequencies. For example, at the low end of a typical frequency spectrum of from 300 MHz to 30 gigahertz, the 1 meter wavelength (at 300 MHz) would require an antenna having a span of approximately 200 feet to collimate the beam width down to 1°. At the high end of such range, a wavelength of 1 cm (at 30 gigahertz) would require an antenna span of approximately two feet, which in itself, might be feasible, but the difficulty of electromechanically synchronizing the scanning of antennas of this size would be very difficult and significantly limit the ranging accuracy.

In the case of scanning antennas mounted on an aircraft, for example, on the opposed wing tips, flexure and vibration of the aircraft body can cause significant and heretofore uncorrectable phase aberrations in the axes of the antenna beams and, hence, phase errors in the signals received from a distant emitter. Accordingly, any attempt to enhance the gain of the scanning antennas, i.e., narrow the beam width in order to improve the theoretical ranging accuracy, will encounter limitations in the signal resolution due to uncorrected, spurious phase shifts of the antenna signals due to small but significant relative movement of different points on the aircraft wings and body. Hence, the lack of physical stability or rigidity of the aircraft platform on which the scanning antennas are mounted, places a limitation on the degree of improvement that can be achieved in ranging resolution by sharpening (narrowing) the beam width of each of the scanning antennas.

Furthermore, in prior ranging and direction of arrival measurement systems that rely on mechanical scanning of one or more antennas, the relatively slow scanning rate may fail to pick up transient emissions that can occur while the antenna is moved away from the source.

SUMMARY

The embodiments of the invention described more fully below concern improvements to passive-type ranging systems such as disclosed in the above-mentioned U.S. Pat. No. 4,339,755 in which scanning sensors, such as RF antennas are mounted on a single, space limited platform, such as an airplane or other vehicle. The limited space results in a baseline separation between the sensors that is a small fraction of the system's operational range, i.e., distances to be measured. In the present invention, the baseline sensors are multi-element interferometers in which the element-to-element spacing for each interferometer sensor is one wavelength or more of the operating frequency of the system. The element-to-element spacing of each interferometer is not to be confused with the baseline separation between the sensors which, in accordance with the teaching in U.S. Pat. No. 4,339,755, is to be maximized within the available space on the platform.

Each of the interferometer sensors exhibits gain versus direction characteristics that appear as a plurality of finger-like lobes, closely spaced but separated by sharply defined nulls. Thus, unlike a relatively large aperture antenna having a dominant beam-like lobe, the interferometer sensors exhibit a plurality of nearly equal strength lobes alternating with sharp nulls. These individual lobes, or nulls, are used to produce a sharply defined sensor axis by indexing one or more particular finger lobes, or nulls, and correlating the received signal to the position of the indexed lobe, or null. To cause the multilobe pattern of each sensor to sweep across the field of interest, electronic steering is employed which involves variable phase shifting of the signals received at the different elements of the interferometer sensor. Synchronous scanning of the interferometers is provided by synchronizing the electronic steering signals. The electronically steered scanning of the interferometer sensors not only enhances the response speed of the system for picking up transient emissions, but also facilitates variation of the scanning rates which is useful in a preferred embodiment of the invention disclosed below.

In the preferred embodiment, automatic calibration and stabilization of the scanning interferometer sensors are achieved by placing on the same platform as the interferometer sensors, a pilot source of emission that is received by the interferometer sensors at one angular position of their respective scanning sweeps. By synchronizing the electronically controlled scanning of the interferometer sensors to the common spatial position provided by the pilot signal, the distinct lobes (or nulls) of each sensor are indexed to create parallel, synchronously scanning highly directional beams, sweeping across the field of interest like synchronized wiper blades on a car windshield. Also, phase synchronization of the antenna elements of the interferometer sensors with a common pilot signal phase minimizes errors in ranging on a distant emitter due to spurious phase shifting of the received signals caused by random structural motion of the aircraft body.

In an alternative embodiment, two or more interferometer sensors are formed by a plurality of at least three antenna elements in which the innermost element is shared by both sensors. The baseline separation of the sensors extends from the midpoint between one outboard element and the shared center element, and the corresponding midpoint between the share element and the other outboard element. In the case of an aircraft platform, the minimum of three elements forming the two interferometer sensors may be mounted along a line coinciding with the wing span with the outboard elements at the wing tips and the shared center element on the fuselage.

To provide disclosure of the invention, reference is made to the appended drawings and following description of preferred and alternative embodiments.

BRIEF DESCRIPTION OF THE DRAWINGS

FIG. 3 is a diagram of a typical interferometer array pattern developed by a single interferometer sensor having two elements separated by a distance D.

FIG. 4 is a comparative diagram of interferometer signals as received by the same interferometer, first when directed at a distant emitter $\Phi$ in the far field (upper wave form), and second, when directed at the pilot emitter $\Phi_p$ in the near field (lower wave form).

FIG. 7 is a block diagram of an alterntaive embodiment of the invention in which a pair of interferometer sensors are synthesized by a three element array arranged along a baseline in which a first interferometer sensor S1' is formed by one outboard element and a shared center element, and the other interferometer sensor S2' is formed by the opposite outboard element and the shared center element.

DETAILED DESCRIPTION OF PREFERRED AND ALTERNATIVE EMBODIMENTS

Figure 1:
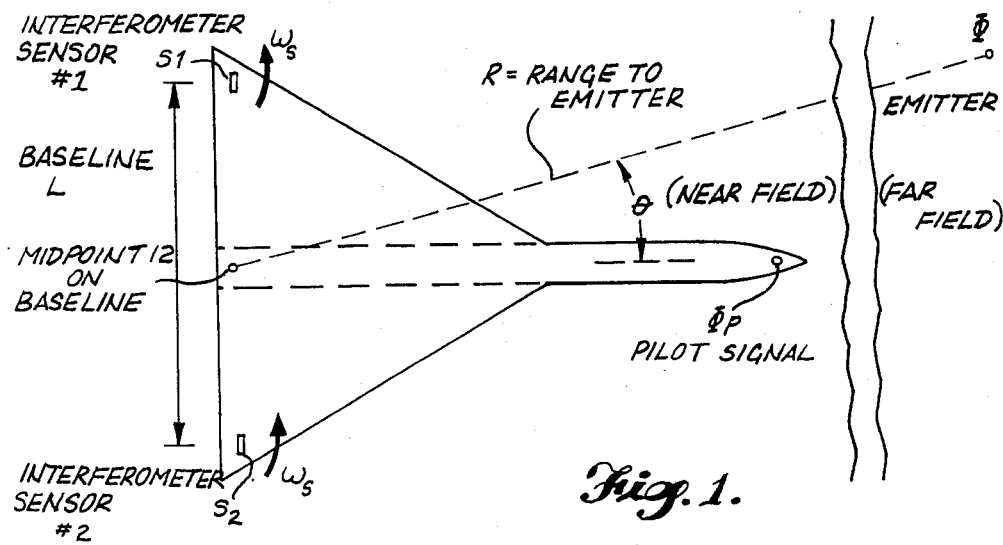
FIG. 1 is a plan view of the passive-ranging method and apparatus using interferometic scanning by sensors mounted on the wing tips of an aircraft.
Figure 2:
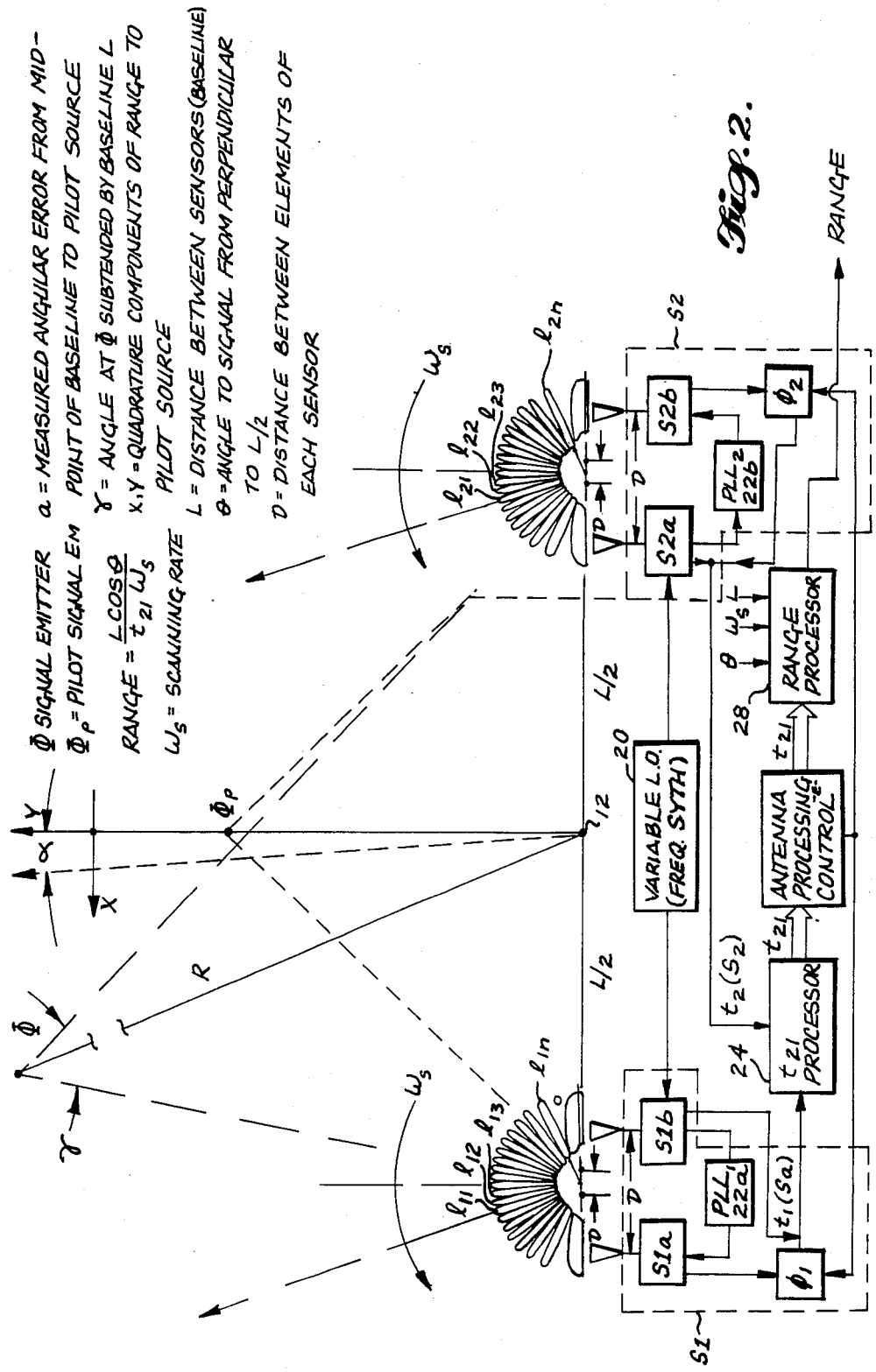
FIG. 2 is a block diagram of the interferometer sensors and associated electronic circuitry used in the apparatus shown in FIG. 1, together with a geometric diagram of the baseline separation of the sensors relative to the pilot emitter $\Phi_p$ mounted on the same aircraft platform and showing the distant emitter $\Phi$ of unknown range R.

With reference to FIGS. 1 and 2, an apparatus is disclosed for passive ranging by using a pair of interferometer sensors S1 and S2 separated along a baseline L on a platform of limited space such as on the aircraft 10 illustrated in FIG. 1. Interferometer sensors S1 and S2 are synchronously scanned by electronic steering of an emitter $\Phi$ located at an unknown range R in the "far field" from a midpoint 12 on the baseline L between sensors S1 and S2. As mentioned above in the summary, this passive type of ranging system makes advantageous use of long (one or more wavelengths) baseline interferometers (sensors S1 and S2), to greatly improve the directivity of the sensors and, hence, the accuracy of the resulting range measurement.

The highly directional lobes and intervening nulls of the interferometer sensors cause sharply defined envelope modulation of the signal received from emitter $\Phi$, when contrasted with large aperture, high gain scanning antennas that have practical limitations of size, difficulty of mounting, high cost, and slow and/or inflexible scanning rates.

Also, in accordance with the preferred embodiment shown in FIGS. 1 and 2, calibration of interferometer sensors S1 and S2 is provided by mounting a pilot signal emitter $\Phi_p$ on the same platform, aircraft 10, at a fixed and known position generally along the boresight of sensors S1 and S2 within a "near field" of the sensors. Pilot emitter $\Phi_p$ produces a point source of a signal of known frequency to which the scanning patterns of sensors S1 and S2 are phase-locked and, hence, automatically calibrated as described in greater detail below. The calibration of sensors S1 and S2 increases the ranging accuracy in the "far field" by enabling the resolution of the extremely small subtended angle $\gamma$(FIG. 2) within the ranging triangle formed by the slant lines from each of sensors S1 and S2 to emitter $\Phi_p$, and the baseline L between the sensors.

In FIG. 2, a triangulation diagram shown in association with interferometer sensors S1 and S2 depicts the basic geometric relationships that are known per se, in measuring range R to the emitter $\Phi$ located at at unknown distance in the "far field." In this known triangulation technique, the range R is a function of the baseline L, a cos of the angle $\theta$ being the angle between midpoint 12 of the baseline and the position of emitter $\Phi$, a time differential $t_{21}$ and the scanning rate $\omega_s$ according to the formula:

$$R \text{ (range)} = (L \cos \theta)/(t_{21} \omega_s) \tag{1}$$

where the paameters L and $\omega_s$ are known, and may be either fixed or variable, and $\theta$ and $t_{21}$ are measured quantities. This ranging formula is derived by equating the following relationships for the angle $\gamma$ subtended by the length of baseline L at the emitter $\Phi$:

$$\gamma \simeq \sin \gamma = (L/R) \tag{2}$$

and;

$$\gamma = (t_{21} \omega_s)/(\cos \theta) \tag{3}$$

Associated with the triangulation diagram for the far field emitter $\Phi$, the diagram in FIG. 2 also shows the triangular relationship between the baseline L of sensors S1 and S2 and the known position of the pilot signal emitter $\Phi_p$, as indicated by the dotted lines drawn between the ends of the baseline and position $\Phi_p$. An angle $\alpha$ is a measured angular error in the sensor determined position of pilot emitter $\Phi_p$ having known quadrature components X, Y. The measured angular error $\alpha$ is used as described more fully below, to produce a static phase shift offset in the electronically steered scanning of sensors S1 and S2 to correct the ranging signal information derived from the far field emitter $\Phi$ and, hence, to correct the measured range R to the far field emitter $\Phi$.

At the ends of baseline L, each of sensors S1 and S2 are shown to exhibit a gain pattern comprising a plurality of radially oriented finger-like lobes $1_{1n}$ (sensor S1) and $1_{2n}$ (sensor S2). These finger-like lobes are rotated by the electronically steered scanning of interferometer sensors S1 and S2 so that each of the multilobe patterns scans at the same scanning rate $\omega_s$ as illustrated. The highly directive characteristics of one or more of the individual sensor lobes such as lobe $1_{11}$ of sensor S1 and lobe $1_{21}$ of sensor S2 are used as indices of antenna direction, i.e., of the sensors. The far field signals from emitter $\Phi$ modulated by the rotation (scanning) of these particular sensor lobes are processed to derive the time differential $t_{21}$ that determines the range R. The scanning characteristics of these multilobe patterns, and the modulation of the far field signal emissions from emitter $\Phi$, are discussed in more detail in connection with FIG. 5 and FIGS. 6a, b and c.

The block diagram of FIG. 2 shows that each of sensors S1 and S2 have multiple antenna elements. Sensor S1 is formed by elements S1a and S1b separated by a distance D, and sensor S2 is formed by elements S2a and S2b, also separated by distance D. The interelement separation D, as mentioned above, must be a wavelength or more in accordance with the known principles of interferometer antennas as disclosed in a reference entitled "Radar System Analysis," by D. K. Barton, published by Artech, pages 55 through 57. As stated in that reference, the angular separaton of the finger-like lobes 1 of the interferometer pattern is determined by the relationship of the signal wavelength $\lambda$ divided by the interelement separation D, with D being equal to or greater than one $\lambda$. In the cited reference by D. K. Barton, the two element interferometer develops a static, multilobe pattern as illustrated in FIG. 3, and as observed therein, the minimum lobe to lobe spacing $\Delta a$, along the boresight of the two element array, is equal to $\lambda$ divided by the spacing D.

As the physical separation (or aperture) D of each sensor, S1 and S2 is significant in terms of wavelength, and since the baseline L between the phase centers of each interferometer S1 and S2 is relatively long, a means of electrical stabilization to compensate for aerodynamic bending and component performance drift has been adopted based on the principles described in the reference "Tolerances In Self-Cohering Antenna Arrays of Arbitrary Geometry" by B. D. Steinberg et al, IEEE Transactions—Antennas and Propagation, Vol. AP24 No. 5, September 1976. This paper, which is incorporated by reference herein, discloses the signal processing employed by sensors S1 and S2 as well as the additional signal processing employed by sensors S1 and S2 for electronically steering used in the present embodiment to form and effect the scanning of the interferometer patterns. This adaptation is described as follows: elements S1a, S1b, S2a and S2b are individual broadband antennas and associated phase-locked receivers. Each antenna element S1a, S1b, S2a and S2b may be a single element having a pattern broad enough to cover the defined field-of-view of the composite interferometers S1 and S2. Each element of each interferometer sensor is individually phase-locked to the pilot signal, $\Phi_p$. This operation is performed by using a frequency component $f_p$ of a frequency synthesized by local oscillator 20, to provide a phase reference for each sensor element S1a, S1b and S2a and S2b. The specific circuitry for such phase-locking is disclosed in detail in the embodiment shown in FIG. 7. By comparing the heterodyned outputs of $\Phi_p$ from sensor elements S1a and S2b with S1b and S2a, respectively, difference signals are obtained of their relative phases, and the difference signals operating on voltage-controlled oscillators (see FIG. 7) of S1a and S2b are driven to achieve phase-lock. This locking action causes the downstream signals from the sensor elements to exhibit phase coherency that in turn allows the signals from S1a and S1b to synthesize interferometer S1, and signals from S2a and S2b to synthesize interferometer S2. The principles of this operation are described in more detail in the referenced paper by B. D. Steinberg.

In the embodiment of FIGS. 1 and 2, each of the two element sensors S1 and S2 is a dynamic, electronically steered scanning interferometer based on the same principles as the above-referenced static interferometer discussed by D. K. Barton, but including signal processing for causing the multilobe pattern to vary in direction as a function of time in accordance with the above summarized teachings of B. D. Steinberg. Such electronic steering is achieved by a dynamic, relative phase shifting of the intermediate frequencies of the received signals at sensor elements S1a, S1b and S2a, S2b. In the present embodiment, sensors S1 and S2 are of the type in which the intermediate frequency signals obtained by mixing the received signals with the output of a local oscillator 20 are variably shifted in phase by phase shifters $\Phi_1$, and $\Phi_2$, at a continuously changing rate which causes the sensor lobes to scan, as viewed in FIG. 2, in a back and forth oscillating motion over a selected angular section.

In order to cover a broad spectrum of emitter $\Phi$ frequencies and still maintain phase coherency with the constant frequency pilot $\Phi_p$, local oscillator 20 is provided by a frequency synthesizer, that functions as a multifrequency local oscillator to generate a range of selectable frequencies used to heterodyne signals of interest within a particular operating band. Of these frequencies, a pilot heterodyning signal $f_p$, is selected for each operating band of interest. The phase-lock loops ($PLL_1$ and $PLL_2$) only respond to the frequency of the selected local oscillator pilot signals $f_p$, produced by synthesizer 20 through the use of appropriate frequency selective circuits operated in correlation with the selected pilot signal $f_p$. Suitable filtering in the phase lock loops is shown in the embodiment of FIG. 7.

To process the sensor outputs for developing range R, each of sensors S1 and S2 are connected to a time difference ($t_{21}$) processor 24 which develops a time differential $t_{21}$ signal via an antenna processing unit 26 and applies signal $t_{21}$ to range processor 28 along with fixed or variable signals representing the angle of arrival $\theta$, scan rate $\omega_s$ and baseline length L. Processor 24 may be of the type described in the above-mentioned U.S. Pat. No. 4,339,755, and also disclosed in U.S. Pat. No. 4,316,193 issued to Phillip Jones et al. on Feb. 16, 1982. Antenna processing and control unit 26 functions as an outer control loop to variably shift the relative phase relationship of the scanning sensors S1 and S2 for effecting the scanning of the lobes and to introduce a static phase shift in one of the sensors to maintain a constant relationship between the effective boresight of sensors and the actual position of the pilot signal emitter $\Phi_p$. For this latter purpose, antenna processing and control unit 26 incorporates means for comparing the raw time differential $t_{21}$ from processor 24 with a predetermined time differential that is calculated to occur given the known position of the pilot emitter $\Phi_p$. Any difference between the measured time differential $t_{21}$ and the calculated time differential causes processing and control unit 26 to introduce a static, relative phase shift in shifter $\phi$, as a function of the outer control loops that controls the scanning angle of sensor S1 in order to align the effective boresight of the sensors with the known position of pilot emitter $\Phi_p$. This results in the spatial calibration of system.

Range processor 28 is a circuit or signal processor that performs the relationship set forth above in equation (1), and a suitable subsystem or circuit for processor 28 is disclosed in above-mentioned U.S. Pat. No. 4,339,755. The inputs to processor 28 other than the measured time differential $t_{21}$ include the baseline length L which is normally a fixed value, the scanning rate $\omega_s$ which may be a fixed or variable, and the angle of arrival $\theta$ which is a variable signal that can be measured by various known means including the angle of arrival resolver and associated detector disclosed in abovementioned U.S. Pat. No. 4,339,755. Another way of measuring $\theta$ is to use one of interferometer sensors S1 and S2 in an auxillary capacity to resolve $\theta$ by employing known techniques of eliminating lobe ambiguity as discussed in the above-mentioned reference by D. K. Barton.

Figure 5:
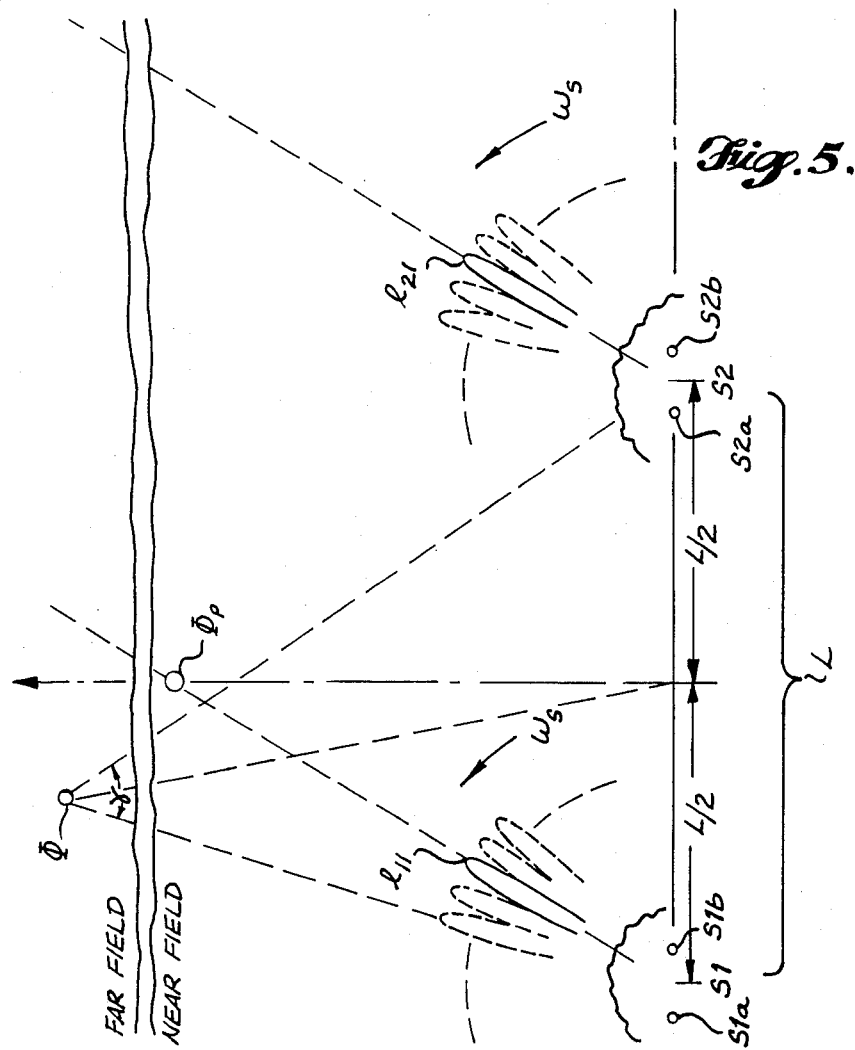
FIG. 5 is a diagram illustrating the synchronous, parallel scanning axes associated with corresponding sensor lobes on two interferometer sensors S1 and S2 of FIGS. 1 and 2, spaced apart by a baseline of length L.

In the operation of the system shown in FIGS. 1 and 2, the multiple finger-like lobes of sensors S1 and S2 exhibit a significant number of ambiguous signal maxima (corresponding to lobes 1) separated by sharp nulls. As these ambiguous lobes rotate into and out of alignment with a far field emitter $\Phi$, the emissions therefrom are observed at sensors S1 and S2 as time varying signals that are the result of spatial modulation of the emissions. From this raw signal data, which includes ambiguous signal maximan and minima, as indicated for example in the waveform diagrams of FIGS. 3 and 4, it is necessary to correlate the signal envelopes of one or more sets of corresponding lobes such as lobes $l_{11}$ and $l_{21}$, so that time differential processor 24 is effective to measure a time differential $t_{21}$ that results from the scanning of the emitter $\Phi$ by parallel lobes and associated axes. Under these conditions, signals are produced at the outputs of sensors S1 and S2 that have a constant delay $t_{21}$ as a function of the range R to the emitter $\Phi$. The above operation is illustrated in FIG. 5 by the scanning of lobe $l_{11}$ of S1 in a counterclockwise direction across the far field emitter $\Phi$. In synchronism, a corresponding lobe $l_{21}$ of sensor S2 defines a maximum gain axis parallel to the axis of lobe $l_{11}$, that subsequently sweeps across the far field emitter $\Phi$.

Figure 6A:
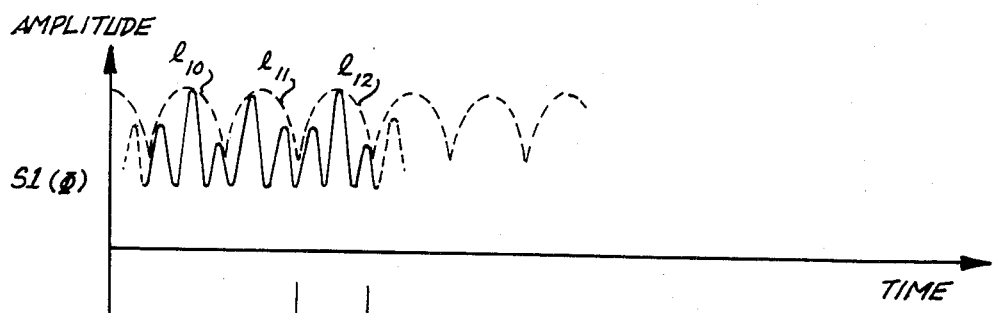
FIGS. 6a, 6b and 6c are a series of wave form diagrams of the signals produced at interferometer sensors S1 and S2 modulated by the plurality of interferometic lobes of these sensors when scanned synchronously and with parallel axes as illustrated in FIG. 5.
Figure 6B:
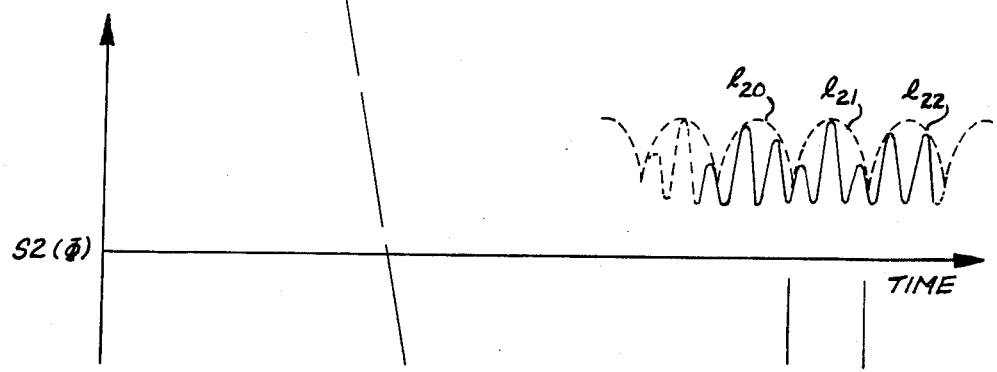
Figure 6C:
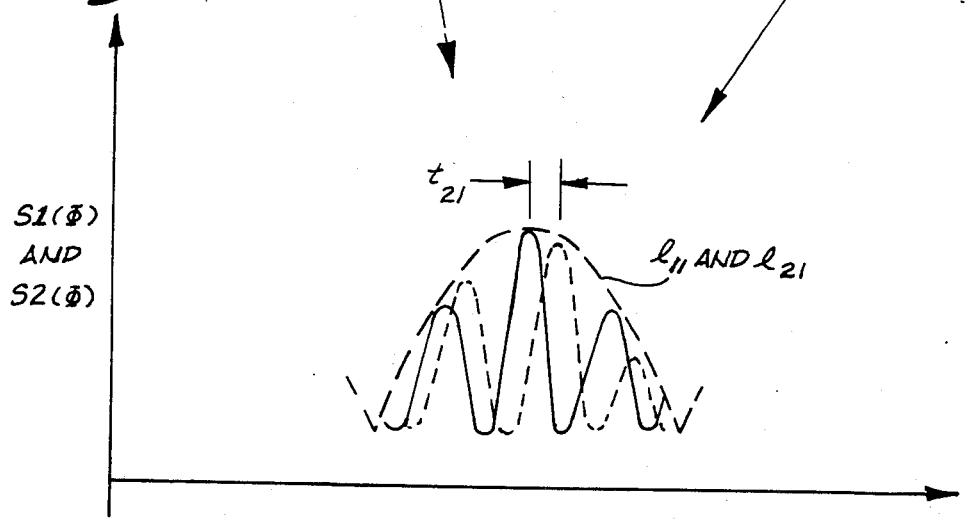

FIGS. 6a and 6b show the modulation of the far field emitter signal by first lobe $l_{11}$ of sensor S1 and then by lobe $l_{21}$ of sensor S2, respectively. The time differential or delay of the emitter signal $\Phi$ modulated by the envelope of lobe $l_{11}$ compared to the time of the emitter signal $\Phi$ modulated by the envelope of lobe $l_{21}$ represents the desired time differential $t_{21}$ as illustrated in FIG. 6c wherein the emitter signals at S1 and S2 corresponding to modulation by lobe $l_{11}$ and $l_{21}$ are shown superimposed to represent the signal correlation that occurs. This correlation is performed by a servo controlled variable delay function incorporated in the type of processor 24 described and referenced above.

To ensure that there is a constant, stabilized phased relationship between the scanning positions or angles of the sensor lobes 1, the sensors are scanned not only across the far field that contains the emitter $\Phi$ of unknown range, but also across the known position of the pilot emitter $\Phi_p$ in the near field. FIG. 3 illustrates an operationsl feature of the system of FIGS. 1 and 2 by which the emitter $\Phi$ in the far field and the pilot emitter $\Phi_p$ in the near field when modulated by the plurality of finger-like lobes of the sensors, will have corresponding or common lobe and null positions. Thus, when the position of individual lobes of the scanning sensor are calibrated with reference to the pilot emitter $\Phi_p$, the position of the far field emitter $\Phi$ can be measured down to the degree of accuracy afforded by the directivity of a single lobe or null. The indexing of the lobe positions to the known position of the pilot emitter $\Phi_p$ is accomplished even though the emitter $\Phi_p$ is in the near field where, by analogy to the optical counterpart, is the Fresnel zone in which the wavelets that combine to create the interference pattern cannot be assumed to arrive along parallel axes, whereas the emitter $\Phi$ is where again by the analogy to optics, the Fraunhauher field conditions exist. Nevertheless, for the purpose of synchronizing the relative scan angles of the sensor patterns, and for the purpose of calibrating the relationship between the range and the time differential $t_{21}$, the near field ranging on pilot emitter $\Phi_p$, is valid. In other words, by spatially synchronizing the rotating multilobe patterns of the sensors such that the time differential $t_{21}$ ($\Phi_p$) is constant, then under such circumstances the effective boresight of the sensors is referenced to a known and stable direction.

One preferred method of calibrating the constant phase relationship between the scanning sensor patterns and the pilot emitter $\Phi_p$, is by measuring the alignment error $\alpha$ between the physical position of pilot emitter $\Phi_p$ near the boresight, and the position electrically measured by sensors S1 and S2. This alignment error $\alpha$, is determined by comparing the value of a measured time $t_{21}$ developed by sensors S1 and S2 scanning on emitter $\Phi_p$, to the idealized time differential $t_{21}$ that is calculated to occur given the known distance between midpoint 12 between the sensors and the known mounting point of the pilot $\Phi_p$ on the platform. The calculated time differential $t_{21}$ results from the equation:

$$t_{21}(\Phi_p) = (L \cos \theta_p)/(R_p \omega_s)$$

where $\theta_p$ is the boresight angle from point 12 (midpoint of baseline L) to $\Phi_p$, and $R_p$ is the known distance between point 12 and the mounting location of $\Phi_p$.

If the difference $\Delta t_{21}$ between the measured $t_{21}(\Phi_p)$ produced by processer 21 (see FIG. 2) the calculated value $t_{21}$, is too small, a correction is made to either or both of sensors S1 and S2 to increase the relative static phase angle between the lobe positions of the sensors. Conversely, if difference $\Delta t_{21}$ is too large, a corresponding phase shift correction is made to decrease the relative static phase angle. For this calibration operation, the scanning rate $\omega_s$ is chosen to be a convenient rate for resolving the time differential $t_{21}$ of the pilot emitter $\Phi_p$ in the near field. A suitable phase shifter $\Delta\phi$ for this purpose is shown in the embodiment of FIG. 7.

In the embodiment described above in connection with FIGS. 1 through 5, the scanning positions of the sensors S1 and S2 are indexed to particular lobes of the sensor patterns. Alternatively, the sharply defined nulls can be used as indices of the scanning positions of the sensors. For example, the scanning axis of sensor S1 in FIG. 2 might be designated at the null between lobes $l_{11}$ and $l_{12}$ and for sensor S2 at the null between lobes $l_{21}$ and $l_{22}$.

Also, in the above-described embodiment, the pilot emitter $\Phi_p$ is placed on or close to the idealized boresight of the pair of sensors. In an alternative embodiment, pilot $\Phi_p$ can be placed at any convenient, known position relative to the base line of sensors S1 and S2 and the calibration and stabilization operation adapted to the skewed position of $\Phi_p$.

Since the applications for this invention are envisioned to be those associated with an airborne platform, it is important to consider the inherent instabilities of measurement associated with relatively long baseline interferometers on aircraft. As mentioned above, the effect of relative motion between the elements of the interferometers caused by the vehicle dynamics can contribute significant noise in the processing of the desired signals. This limitation is overcome to a large extent by the previously described phase lock control of the phase relationship between the signals from the individual antenna elements, or, the combination of elements of the interferometer arrays, and the pilot signal $\Phi_p$.

This phase locking feature is especially important when emissions consisting of weak signals are being processed, requiring long integration times by comparison with the period of vehicle perturbations. Examples of this latter class of signals are those associated with CW radar, communications, and signals beyond normal line-of-sight operating in the diffraction zones. Also, the stabilizing effect of the phase-locking to the pilot is very important when usingstabilizing effect of the phase-locking to the pilot is very important when using long base line sensors to achieve high precision range and angle of arrival measurements. For these applications, FIG. 7 illustrates a suitable control circuit.

In FIG. 7, $\Phi_p$ (a pilot signal), is measured with respect to the boresight at each sensor (S1' and S2'). S1' and S2' are composed of three RF channels, originating at antenna elements B, C and D. These channels are used to synthesize collimated, scanning interferometers. Channel C is shared by both channels B and D to form a composite two interferometer system. The phase center I of interferometer S1', is located halfway between the phase centers of antennas of channels B and C. Likewise, P, is the equivalent phase center for interferometer S2'. Thus I and P are the points of reference for the boresights of S1' and S2' when scanning either the pilot signal emitter, $\Phi_p$, at point A, or a remote emitter, $\Phi$, at some frequency within the passband of the receiver channels of B, C and D.

Each channel performs a frequency translation to an IF frequency. $f_{IF}$. The IF signal in each channel is processed by a logrithmic IF amplifier F, J and K with outputs delivered of channels B and D delivered to phase detectors Z and N, respectively. The IF signal at M, (channel C) serves as the phase coherent reference signals for Channels B and D and originate at local oscillator 65 (provided by a frequency synthesizer as described above for local oscillator 20 of FIG. 2). Therefore, the signal at M (as the reference) is jointly connected to the phase detectors at Z and N. Any phase displacement of the channels with respect to the pilot signal, $\Phi_p$, different than the quiescent phase relationship between chanenls C and D, is corrected by the phase-locked loops consisting of mixer E, log IF amplifier F phase-detector Z, filter B and voltage controlled oscillator (VCO) O for channel B, and consisting of corresponding components H, K, N, B and O' for channel C.

The interferometers S1' and S2', are formed by combining the outputs of channels B and C, and D and C in signal combiners $\Sigma_1$ and $\Sigma_2$, respectively, after being processed by variable phase shifters $\phi_1$ and $\phi_2$. Phase shifters $\Phi_1$, and $\Phi_2$ are driven by a scanning signal control $\omega_s$ to cause the lobe patterns to sweep back and forth across the field of interest. The envelopes of the signals from S1' and S2' are determined from the output of detectors $DET_1$ and $DET_2$. These outputs are compared in the comparator 70 which produces an output time difference, $t_{21}$.

A calibration operation is performed based on a predetermined time difference, $T_R$ corresponding to the distances from A to I and A to P, the phase centers of S1' and S2' respectively, and for a particular scanning rate ($\omega_{sJ}$) stored in a $t_{21}$ processor and antenna control 70 corresponding to processor 24 and control 26 of FIG. 2. The difference between $T_R$ and $t_{21} = \Delta T_{21}$, $\Delta T_{21}$ is used to generate the corrections for S1' and S2' and is delivered to the IF static phase shifter at Y as described above in connection with calibration operation of FIG. 2. The effect is to provide a calibration function for the positioning of the lobes or nulls of the sensor patterns used for signal scanning. Of course, the effects of near field distortion of the pilot signal, plus differences in the relative path lengths $L_3$ and $L_4$ as a function of the scanning angles $\theta_1$ and $\theta_2$ must be accounted for, as well. The corrected $t_{21}$ signal is achieved to range processor 72 for producing a range R signal as a function of $t_{21}$, L, $\theta$, and $\omega_s$.

While only particular embodiments have been disclosed herein, it will be readily apparent to persons skilled in the art that numerous changes and modifications can be made to the devices and method steps disclosed herein without departing from the spirit of the invention as set forth in the following claims.

I claim:

1. An apparatus for determining the range R of a distant source of electromagnetic emission $\Phi$ from a monitoring platform, comprising:

first and second radio frequency interferometer sensors mounted on said platform at spaced-apart positions separated by a baseline of length L, and each of said first and second interferometer sensors having a multilobe gain pattern of multiple, substantially equal strength, finger-like lobes extending outwardly from a center of the sensor in which individual lobes of the pattern associated with each sensor define receiving axes that are movable in a scanning motion across a field of interest containing the source of electromagnetic emission $\Phi$;

a source of pilot signal mounted on said platform at a predetermined position relative to said first and second interferometer sensors;

circuit means connected to said first and second interferometer sensors for causing said multilobe patterns to scan at a rate $w_s$ in said scanning motion across the field of interest, said circuit means including means responsive to said source of pilot signal for synchronizing the sweep angles of said multilobe patterns so that predetermined lobes of said patterns exhibit parallel axes and the sweeping motion thereof cause said first and second interferometer sensors to produce output signals that are time varying signals resulting from the spatial modulation of the source of emission Φ by the sweeping motion of said predetermined lobes;

time difference processing means for responding to the output signals produced by said first and second interferometer sensors and developing a time difference signal $t_{21}$ representing a range dependent time difference of the receptions of the source of emission Φ along parallel scanning axes; and range processor means for responding to said time difference signal $t_{21}$ and producing a signal representing range R as a function of said signal $t_{21}$ and as a function of the scan rate $w_s$ of the sweeping motion of said multilobe patterns, and of an angle of arrival $\theta$ of the source of electromagnetic emission measured at said platform relative to said baseline.

2. The apparatus of claim 1, wherein said platform is an aircraft having wings and a nose, and wherein said first and second interferometer sensors are mounted on said aircraft so that said baseline of length L extends from a point on one wing to a point on the opposite wing, and wherein said source of said pilot signal is mounted on a centerline of the aircraft adjacent said nose.

3. The apparatus of claim 1, wherein said first and second interferometer sensors comprise a plurality of antenna elements arrayed along a baseline in spaced-apart relation in which the spacing between adacent elements of said sensors is equal to or greater than a predetermined wavelength $\lambda$ of the emission Φ.

4. The apparatus of claim 1, wherein each of said first and second interferometer sensors comprise a pair of antenna elements separated by a distance D that is equal to or greater than a predetermined wavelength $\lambda$ of the emission Φ.

5. An apparatus for determining the range R of a distant source of electromagnetic emission Φ from a monitoring platform, comprising:

first and second radio freqeuncy interferometer sensors mounted on said platform at spaced-apart positions separated by a baseline of length L, and each of said first and second interferometer sensors having a multilobe gain pattern of multiple, substantially equal strength, finger-like lobes extending outwardly from a center of the sensor in which individual lobes of the pattern associated with each sensor define receiving axes that are movable in a scanning motion across a field of interest containing the source of electromagnetic emission Φ;

means associated with said first and second interferometer sensor for causing said multilobe patterns to scan at a rate $w_s$ in said scanning motion across the field of interest, and for synchronizing the sweep angles of said multilobe patterns so that corresponding lobes of said patterns exhibit parallel axes and the sweeping motion thereof cause said first and second interferometer sensors to produce output signals that are time varying signals resulting from the spatial modulation of the source of emission Φ by the moving lobes;

time difference processing means for responding to the modulated signals produced by said first and second interferometer sensors and developing a time difference signals $t_{21}$ representing a range dependent time difference of the receptions of the source of emission Φ along parallel scanning axes; and range processor means for responding to said time difference signal $t_{21}$ and producing a signal representing range R as a function of said signal $t_{21}$ and as a function of the scan rate $w_s$ of the sweeping motion of said multilobe patterns, and of an angle of arrival $\theta$ of the source of electromagnetic emission measured at said platform relative to said baseline.

6. The apparatus of claim 5, wherein said first and second interferometer sensors comprise a plurality of antenna elements arrayed along a baseline in spaced-apart relation in which the spacing between adjacent elements of said sensors is equal to or greater than a predetermined wavelength $\lambda$ of the emission Φ.

7. The apparatus of claim 5, wherein each of said first and second interferometer sensors comprise a pair of antenna elements separated by a distance D that is equal to or greater than a predetermined wavelength $\lambda$ of the emission Φ.

8. In an apparatus for determining the range R of a distant source $\phi$ of radio frequency emission from a monitoring platform that has first and second directional sensors mounted on the platform at spaced locations separated by baseline of length L, and has scanning means for synchronously scanning the first and second directional sensors at a scan rate $\omega_s$ across a field containing the source $\phi$ to cause the sensors to produce reception signals responsive to source $\phi$ that have a time differential $t_{21}$ from which the range R is computed, the improvement in said apparatus wherein:

said first and second sensors comprise radio frequency interferometers formed by an array of multiple antenna elements in which each of the first and second thusly formed interferometer sensors exhibit a gain pattern of multiple, substantially equal strength, finger-like lobes extending generally radially outward from a center of the sensor; and wherein said scanning means comprises electronic steering circuit means coupled to said multiple antenna elements to cause said patterns of multiple lobes associated with each of said first and second interferometer sensors to move in synchronism relative to said platform to scan across the field in which source $\phi$ is located.

9. A method of measuring the range R of a distant source of electromagnetic emission Φ from a monitoring platform, comprising:

forming first and second radio frequency interferometer sensors on the platform and spacing such sensors along a baseline of length L, so that each of said first and second interferometer sensors exhibits a multilobe gain pattern of multiple, substantially equal strength, finger-like lobes extending outwardly from a center of the sensor in which individual lobes of the pattern associated with each sensor define receiving axes;

causing said multilobe patterns to scan at a rate $w_s$ in said scanning motion across the field of interest that contains the source of emission Φ, so that seeping motion thereof causes said first and second interferometer sensors to produce output signals that are time varying signals resulting from the spatial modulation of the source of emission Φ by the moving lobes;

developing a time difference signal $t_{21}$ in response to said output signals representing a range dependent time difference of the receptions of the source of emission Φ along parallel scanning axes defined by corresponding parallel lobes of said patterns; and processing said time difference signals $t_{21}$ and producing a signal representing range R as a function of said signal $t_{21}$ and as a function of the scan rate $w_s$ of the sweeping motion of said multilobe patterns, and of an angle of arrival θ of the source of electromagnetic emission measured at said platform relative to said baseline.

10. An apparatus for determining the range R of a distant source of electromagnetic emission Φ from a monitoring platform, comprising:

first and second radio frequency interferometer sensors mounted on said platform at spaced-apart positions separated by a baseline of length L, and each of said first and second interferometer sensors having a multilobe gain pattern of multiple, substantially equal strength, finger-like lobes extending from a center of the sensor in which individual lobes of the pattern associated with each sensor define receiving axes that are movable in a scanning motion across a field of interest containing the source of electromagnetic emission Φ, said first and second interferometer sensors comprise an array including a shared center antenna element mounted on said baseline and two outboard antenna elements mounted on opposite sides of said center element in line with said baseline;

a source of pilot signal mounted on said platform at a predetermined position relative to said first and second interferometer sensors;

circuit means connected to said first and second interferometer sensors for causing said multilobe patterns to scan at a rate $w_s$ in said scanning motion across the field of interest, said circuit means including means responsive to said source of pilot signal for synchronizing the sweep angles of said multilobe patterns so that predetermined lobes of said patterns exhibit parallel axes and the sweeping motion thereof cause said first and second interferometer sensors to produce output signals that are time varying signals resulting from the spatial modulation of the source of emission Φ by the sweeping motion of said predetermined lobes;

time difference processing means for responding to the output signals produced by said first and second interferometer sensors and developing a time difference signals $t_{21}$ representing a range dependent time difference of the receptions of the source of emission Φ along parallel scanning axes; and range processor means for responding to said time difference signal $t_{21}$ and producing a signal representing range R as a function of said signal $t_{21}$ and as a function of the scan rate $w_s$ of the sweeping motion of said multilobe patterns, and of an angle of arrival θ of the source of electromagnetic emission measured at said platform relative to said baseline.

11. The apparatus of claim 10, wherein said first and second interferometer sensors further comprise a reference receiving channel connected to said center antenna element for receiving said source of pilot signal to produce a reference signal phase, a first outboard receiving channel connected to one of said outboard antenna elements and a second outboard receiving channel connected to the other of said outboard antenna elements, a first phase-lock loop circuit connected between said reference receiving channel and said first outboard receiving channel for establishing a phase locked relationship between said reference phase signal derived from the pilot signal and said first outboard receiving channel, and a second phase lock loop connected between said reference receiving channel and said second outboard receiving channel for establishing a locked phase relationship between said reference signal phase derived from said pilot signal and said second outboard receiving channel.

12. The apparatus of claim 11, wherein said circuit means for causing said multilobe interference patterns to scan in said sweeping motion comprises variable phase shifting means connected to said first and second interferometer sensors, and scanning control circuit means for driving said phase shifting means with a scan control signal having a scan rate of $\omega_s$.

13. An apparatus for determining the range R of a distant source of electromagnetic emission Φ from a monitoring platform, comprising:

first and second radio frequency interferometer sensors mounted on said platform at spaced-apart positions separated by a baseline of length L, and each of said first and second interferometer sensors having a multilobe gain pattern of multiple, substantially equal strength, finger-like lobes extending outwardly from a center of the sensor in which individual lobes of the pattern associated with each sensor define receiving axes that are movable in a scanning motion across a field of interest containing the source of electromagnetic emission Φ;

a source of pilot signal mounted on said platform at a predetermined position relative to said first and second interferometer sensors;

circuit means connected to said first and second interferometer sensors for causing said multilobe patterns to scan at a rate $w_s$ in said scanning motion across the field of interest, said circuit means including means responsive to said source of pilot signal for synchronizing the sweep angles of said multilobe patterns so that predetermined lobes of said patterns exhibit parallel axes and the sweeping motion thereof cause said first and second interferometer sensors to produce output signals that are time varying signals resulting from the spatial modulation of the source of emission by the sweeping motion of said predetermined lobes;

time difference processing means for responding to the output signals produced by said first and second interferometer sensors and developing a time difference signal $t_{21}$ respresenting a range dependent time difference of the receptions of the source of emission Φ along parallel scanning axes;

range processor means for responding to said time difference signal $t_{21}$ and producing a signal representing range R as a function of said signal $t_{21}$ and as a function of the scan rate $w_s$ of the sweeping motion of said multilobe patterns, and of an angle of arrival φ of the source of electromagnetic emission measured at said platform relative to said baseline; and calibrating means that includes means for producing a predetermined time differential signal $T_R$ representing a reference time differential associated with the range distance to said source of pilot signal from a midpoint of said baseline, and means for producing an electrically measured time differential $t_{21}(\Phi_p)$ corresponding to a measured range that results from the scanning of said first and second interferometer sensors across said source of pilot signal, and means for comparing $t_{21}(\Phi_p)$ with said predetermined time $T_R$ to produce a correction signal $\Delta t_{21}$, and a variable phase shifter connected to one of said first and second interferometer sensors for introducing a static, nonscanning phase shift in the phase of a signal received thereby to reduce said correction signal $\Delta t_{21}$ to zero so as to calibrate the apparatus to the predetermined reference time difference $T_R$.

14. In an apparatus for determining the range R of a distant source $\Phi$ of radio frequency emission from a monitoring platform that has first and second directional sensors mounted on the platform at space locations separated by baseline of length L, and has scanning means for synchronously scanning the first and second directional sensors at a scan rate $w_s$ across a field containing the source $\Phi$ to cause the sensors to produce reception signals responsive to source $\Phi$ that have a time differential $t_{21}$ from which the range R is computed, the improvement is said apparatus wherein:

said first and second sensors comprise radio frequency interferometers formed by an array of multiple antenna elements in which each of the first and second thusly formed interferometer sensors exhibit a gain pattern of multiple, substantially equal strength, finger-like lobes extending generally radially outward from a center of the sensor;

wherein said scanning means comprises electronic steering circuit means coupled to said multiple antenna element to cause said patterns of multiple lobes associated with each of said first and second interferometer sensors to move in synchronism relative to said platform to scan across the filed in which source $\Phi$ is located; and pilot signal source mounted on said platform at a fixed distance from said first and second interferometer sensors, and wherein said scanning means includes means for phase-lock synchronization of the signals developed by said first and second sensors to a pilot signal emitted by said pilot signal source.

15. The improvement in the apparatus of claim 14, wherein said scanning means further includes means downstream of said means for phase-lock synchronization for causing a variable phase shift in the signals received by said firt and second interferometer sensors.

16. A method of measuring the range R of a distant source of electromagnetic emission $\Phi$ from a monitoring platform, comprising:

forming first and second radio frequency interferometer sensors on the platform and spacing such sensors along a baseline of length L, so that each of said first and second interferometer sensors exhibits a multilobe gain pattern of multiple, substantially equal strength, finger-like lobes extending outwardly from a center of the sensor in which individual lobes of the pattern associated with each sensor define receiving axes;

causing said multilobe patterns to scan at a rate $w_s$ in said scanning motion across the field of interest that contains the source of emission $\Phi$, so that the sweeping motion thereof causes said first and second interferometer sensors to produce output signals that are time varying signals resulting from the spatial modulation of the source of emission o by the moving lobes;

developing a time difference signal $t_{21}$ in response to said output signals representing a range dependent time difference of the receptions of the source of emission $\Phi$ along parallel scanning axes defined by corresponding parallel lobes of said patterns;

processing said time difference signal $t_{21}$ and producing a signal representing range R as a function of said signal $t_{21}$ and as a function of the scan rate $w_s$ of the sweeping motion of said multilobe patterns, and of an angle of arrival $\theta$ of the source of electromagnetic emission measured at said platform relative to said baseline;

emitting a pilot signal from a predetermined position on the platform spaced from the positions of said sensors; and calibrating the signal $t_{21}$ to a predetermined time differential signal $T_R$ representing a reference time differential associated with the range distance to said pilot signal from a midpoint of said baseline between said sensors, by producing an electrically measured time differential $t_{21}(\Phi_p)$ corresponding to a measured range that results from the scanning of said first and second interferometer sensors across said pilot signal, and comparing $t_{21}(\Phi_p)$ with said predetermined time $T_R$ to produce a correction signal $t_{21}$, and introducing a static, nonscanning phase shift in the phase of a signal received thereby to reduce said correction signal $\Delta t_{21}$ to zero so as to calibrate the apparatus to the predetermined reference time difference $T_R$.

* * * * *

UNITED STATES PATENT AND TRADEMARK OFFICE
CERTIFICATE OF CORRECTION

PATENT NO. : 4,642,649

DATED : February 10, 1987

INVENTOR(S) : Fred M. Lightfoot

It is certified that error appears in the above-identified patent and that said Letters Patent is hereby corrected as shown below:

Column 11, line 36 (Claim 3, line 4), "adacent" should be --adjacent--

Column 11, line 47 (Claim 5, line 4), "freqeuncy" should be --frequency--

Column 11, line 59 (Claim 5, line 16), "sensor" should be --sensors--

Column 12, line 4 (Claim 5, line 29), "signals" should be --signal--

Column 12, line 68 (Claim 9, line 16), "seeping" should be --sweeping--

Column 13, line 10 (Claim 9, line 26), "signals" should be --signal--

Column 13, line 55 (Claim 10, line 39), "signals" should be --signal--

UNITED STATES PATENT AND TRADEMARK OFFICE
CERTIFICATE OF CORRECTION

PATENT NO. : 4,642,649 (Page 2 of 2)

DATED : February 10, 1987

INVENTOR(S) : Fred M. Lightfoot

It is certified that error appears in the above-identified patent and that said Letters Patent is hereby corrected as shown below:

Column 15, line 22 (Claim 14, line 4), "space" should be --spaced--

Column 15, line 42, (Claim 14, line 24), "filed" should be --field--

Column 16, line 2 (Claim 15, line 5), "firt" should be --first--

Column 16, line 21 (Claim 16, line 19), "o" should be -- $\phi$ --

Signed and Sealed this

Twenty-ninth Day of December, 1987

Attest:

DONALD J. QUIGG

Attesting Officer

Commissioner of Patents and Trademarks